US008186366B2

(12) United States Patent
Montoya et al.

(10) Patent No.: US 8,186,366 B2
(45) Date of Patent: May 29, 2012

(54) PORTABLE MANUAL CAR WASH ASSEMBLY

(76) Inventors: Jerry J. Montoya, Chatsworth, CA (US); Nicomedes A. Trujillo, Alamosa, CO (US)

(\*) Notice: Subject to any disclaimer, the term of this patent is extended or adjusted under 35 U.S.C. 154(b) by 617 days.

(21) Appl. No.: 12/324,027

(22) Filed: Nov. 26, 2008

(65) Prior Publication Data
US 2009/0133726 A1 May 28, 2009

Related U.S. Application Data

(60) Provisional application No. 60/990,032, filed on Nov. 26, 2007.

(51) Int. Cl.
*B08B 3/02* (2006.01)
*B08B 3/04* (2006.01)
*B05B 1/02* (2006.01)
*B05B 1/18* (2006.01)
*B05B 15/06* (2006.01)

(52) U.S. Cl. ........ 134/123; 134/172; 134/178; 134/184; 134/187; 134/189; 134/198; 239/99; 239/284.1; 239/289; 239/397; 239/525; 239/569; 239/587.1; 239/587.5

(58) Field of Classification Search ................. 134/123, 134/172, 198, 199; 239/246, 264, 265, 101, 239/140, 222, 229, 289, 397, 587.5
See application file for complete search history.

(56) References Cited

U.S. PATENT DOCUMENTS

| | | | |
|---|---|---|---|
| 3,044,088 A | 7/1962 | Anderson | |
| 3,139,096 A | 6/1964 | Harris | |
| 3,228,613 A * | 1/1966 | Goldstein | 239/318 |
| 3,401,707 A | 9/1968 | Horwitz | |
| 4,796,808 A | 1/1989 | Linda et al. | |
| 4,936,330 A | 6/1990 | LaHue | |
| 5,284,298 A | 2/1994 | Haynes et al. | |
| 5,671,954 A * | 9/1997 | Cheramie | 285/281 |
| 5,727,580 A * | 3/1998 | Patterson | 134/115 R |
| 6,116,525 A | 9/2000 | Grimes | |
| 6,220,526 B1 | 4/2001 | Johnson | |
| 6,372,053 B1 | 4/2002 | Belanger et al. | |
| 6,981,654 B2 | 1/2006 | McKenna | |
| 7,293,750 B2 * | 11/2007 | Richter | 248/205.5 |
| 2004/0011389 A1 | 1/2004 | Rosborough | |
| 2004/0079402 A1 | 4/2004 | Shin | |
| 2004/0232276 A1 | 11/2004 | Ferris | |
| 2005/0145717 A1 * | 7/2005 | Katz et al. | 239/279 |
| 2005/0205116 A1 | 9/2005 | Zinski et al. | |

\* cited by examiner

*Primary Examiner* — Michael Kornakov
*Assistant Examiner* — Natasha Campbell
(74) *Attorney, Agent, or Firm* — Kelly & Kelley, LLP

(57) ABSTRACT

A portable manual vehicle wash assembly including a base removably attachable to a top exterior surface of a vehicle. A hollow pipe is attached to the base and includes an inlet formed at a first end thereof, and an outlet at a second end thereof. The inlet is adapted to receive an end of a first hose in fluid communication with a water source. The outlet is generally directed away from the exterior surface of the vehicle, and has a swivel member attached thereto. The swivel member is connected to a water emitter, typically in the form of a second hose or a spray nozzle.

13 Claims, 7 Drawing Sheets

PORTABLE MANUAL CAR WASH ASSEMBLY

BACKGROUND OF THE INVENTION

The present invention generally relates to vehicle washing devices. More particularly, the present invention relates to a portable vehicle wash assembly for facilitating manually washing a vehicle and preventing hoses used in association therewith from becoming caught under the tires or other portions of the vehicle.

Surface dirt can mar the finish of an otherwise beautiful vehicle. For this reason, many people are quite scrupulous in keeping their car clean. Accordingly, the prior art contains many designs for car washes. Most often, these car washes are the fully automated type in which an attendant sets the system for the type of vehicle and the type of wash and treatment to be carried out. There are some car systems in which the customer can select his own process. Many of these devices are complicated and expensive, and may require complicated sensors, systems and the like to operate.

While successful and well accepted, these known car wash systems have a drawback in that the vehicle owner must bring his vehicle to the car wash, wait in line, and pay a premium to have the car washed. Many people simply choose not to have their car washed rather than put up with the inconveniences and cost.

An alternative to having a car washed in such an automated environment is to simply wash the car at home, and many people opt for this approach. However, washing the car at home, while overcoming the above-stated problems associated with the automated car wash systems, presents some problems of its own.

Typically, a homeowner utilizes a garden hose, with or without attachments at the end thereof, to wash the vehicle. A common problem encountered in this manner is that the hose becomes caught underneath one of the tires or a lower portion of the body of the vehicle, and the owner must free the hose from such obstacle, by either retracing his steps backwards or flinging the hose violently to free the hose from the obstruction. Of course, this can be a source of aggravation, is time consuming, and in some instances can actually damage the car.

Attempts have been made to overcome the problems associated with manually washing a car at home, while still providing benefits associated with automated car washing machines. For example, U.S. Pat. No. 3,139,096 to Harris discloses a portable car wash wherein an elongated section of perforated hose is attached to a top of a car. While wetting a substantial portion of the car simultaneously, with or without detergent, this device presents various drawbacks. A second garden hose, or the like, would be required to wash the car as the cascading effect of the water emitted from the closed-end hose would still require pressure washing at various points of the car. Moreover, when attempting to wash the upper surface of the trunk, roof and hood, the closed-ended hose would present an obstacle of doing so. Thus, the hose would need to be moved periodically to wash underneath the hose section itself.

U.S. Pat. No. 3,401,707 to Horwitz provides a similar portable vehicle washing device. However, in this case, sections of rigid tubing having perforations therein form a circular halo positioned above the roof of the car, while an elongated T-section is draped on either side of the car. Once again, a second garden hose would likely be required in order to adequately wash the car using a hand-held nozzle or the like. Furthermore, this assembly presents the same disadvantages of impeding access to all points of the vehicle being washed. Furthermore, this particular device requires setup, breakdown, and storage which is inconvenient to the homeowner.

U.S. Pat. No. 4,936,330 to LaHue is also directed to a portable vehicle washing device. The device is generally shaped as a sawhorse, with angled legs extending downwardly for contact with the underlying ground surface. A pipe extends between the apex of each set of legs, and is positioned above the roof of the car. A series of apertures emit a water or water/soap mixture onto the vehicle. Once again, the device itself of LaHue would impede access to all points of the vehicle being washed. Moreover, this particular device is even more cumbersome to put together, breakdown, and store.

Accordingly, there is a continuing need for an assembly for manually washing a vehicle which substantially prevents the hose from becoming obstructed by a tire or lower portion of the vehicle or getting a kink therein while washing the vehicle. Such an assembly should be fairly simple to operate and provide maximum access to the vehicle being washed. Moreover, the assembly should not impede access to the vehicle being washed, and should be fairly small so as to be portable and easily stored. The present invention fulfills these needs and provides other related advantages.

SUMMARY OF THE INVENTION

The present invention resides in a portable manual vehicle wash assembly. The assembly generally comprises a base which is removably attachable to a top exterior surface of a vehicle. In a particularly preferred embodiment, the base comprises a suction membrane. A lever is operably attached to the membrane, for selectively raising and lowering the suction membrane so as to selectively create suction between the base and the exterior surface of the vehicle.

A hollow pipe is attached to the base. A water inlet is formed at a first end of the pipe, which is adapted to receive an end of a first hose in fluid communication with a source of water. The first end of the pipe may include a valve for manually selectively permitting water to pass into the pipe. The valve may be removably attached to the first end of the pipe. A water outlet is formed at a second end of the pipe, which is generally directed away from the exterior surface of the vehicle.

A swivel member is attached to the water outlet, and adapted for connection to a water emitter. In one embodiment, a quick connector is disposed between the second end of the pipe and the swivel member. Typically, the water emitter is removably attachable to the swivel member. The water emitter may comprise a second hose, having an end thereof connected to the swivel member. At the opposite end of the second hose a manually actuated water nozzle may be attached. Alternatively, the water emitter may comprise a nozzle, which is manually adjustable.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a portable, manual vehicle wash assembly, generally referred to by the reference number 100. As will be more fully described herein, the assembly 100 can be mounted onto a vehicle in order to assist the owner in manually washing the vehicle. As used herein, the term "vehicle" is intended to encompass all types of vehicles, including vans, sport utility vehicles, trucks, cars, boats and the like. The assembly 100 of the present invention significantly reduces kinks in the hose, or getting the hose caught or hung up on any of the four tires or lower body portions of the vehicle, and provides other advantages. As will be more fully described herein, the assembly 100 of the present invention enables the user to freely rotate or swivel the hose about the assembly 100 such that the hose can be easily maneuvered around the entire vehicle for purposes of washing and rinsing the vehicle.

Figure 1:
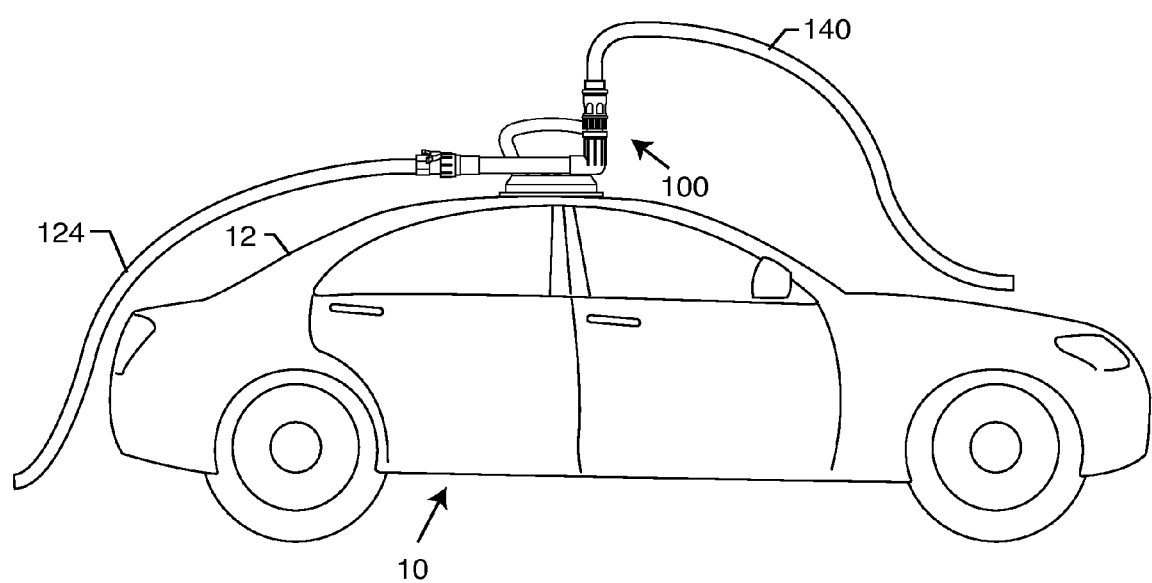
FIG. 1 is a side elevational diagrammatic view illustrating a portable manual vehicle wash assembly attached to an exterior surface of a vehicle, in accordance with the present invention.
Figure 2:
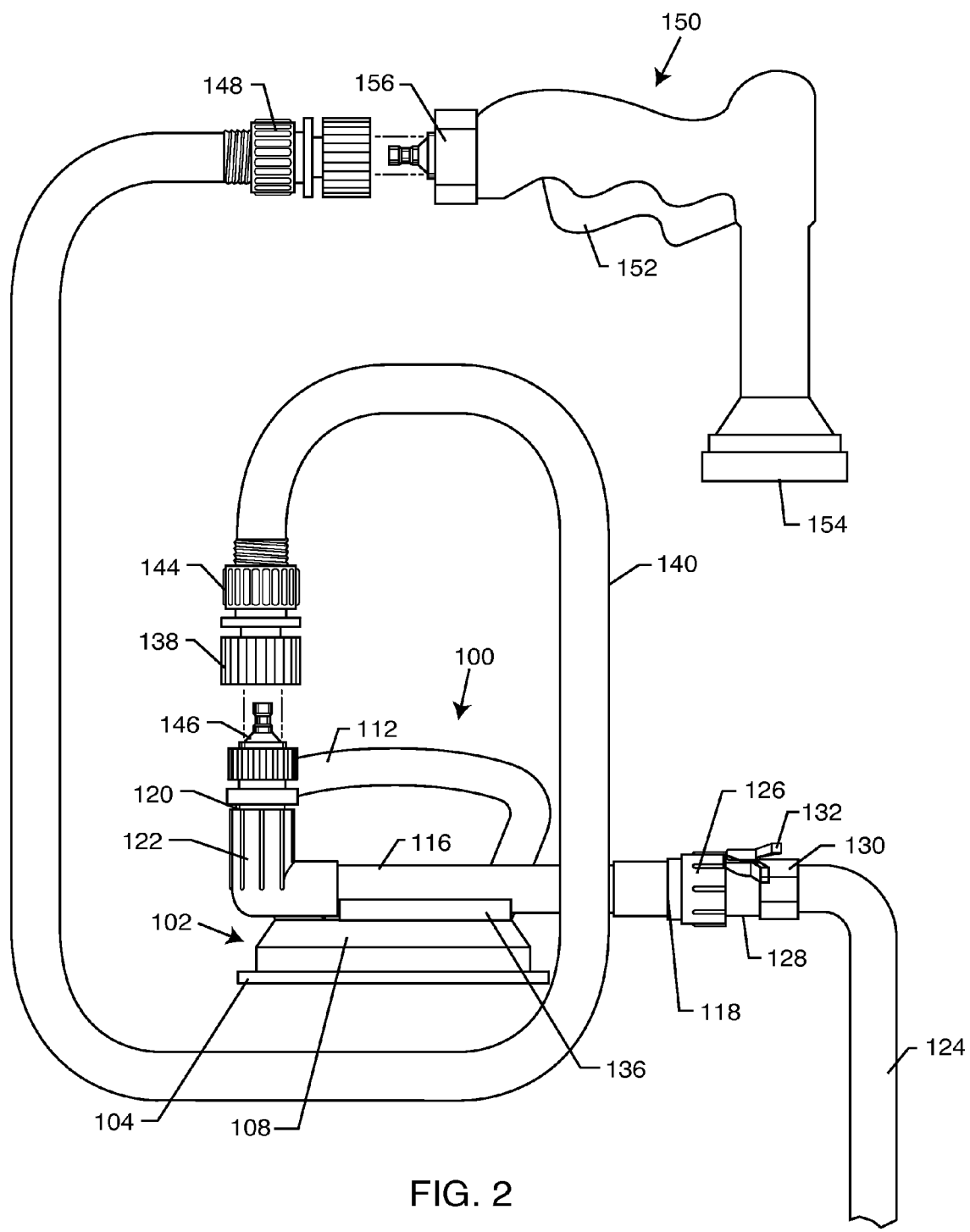
FIG. 2 is a partially exploded and fragmented elevational view of the portable manual vehicle wash assembly embodying the present invention.

With reference now to FIGS. 1 and 2, the assembly 100 of the present invention includes a base 102 which is adapted to be removably attached to an exterior top surface 12 of a vehicle 10. The exterior top surface typically comprises the roof of the vehicle 10, but can also comprise the windshield, back window, hood or even trunk of the vehicle. However, it will be appreciated by those skilled in the art that the preferred placement is at the apex, or roof of the vehicle 10.

Figure 3:
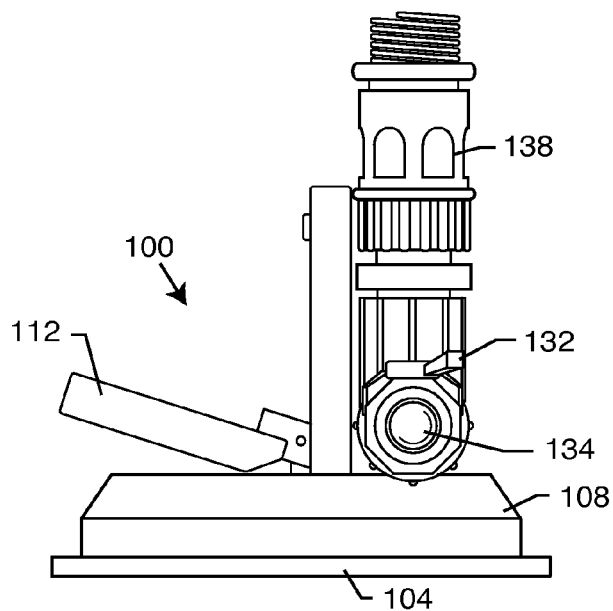
FIG. 3 is an end elevational view of the portable manual vehicle wash assembly, illustrating a lever and suction membrane thereof in a lowered position.
Figure 4:
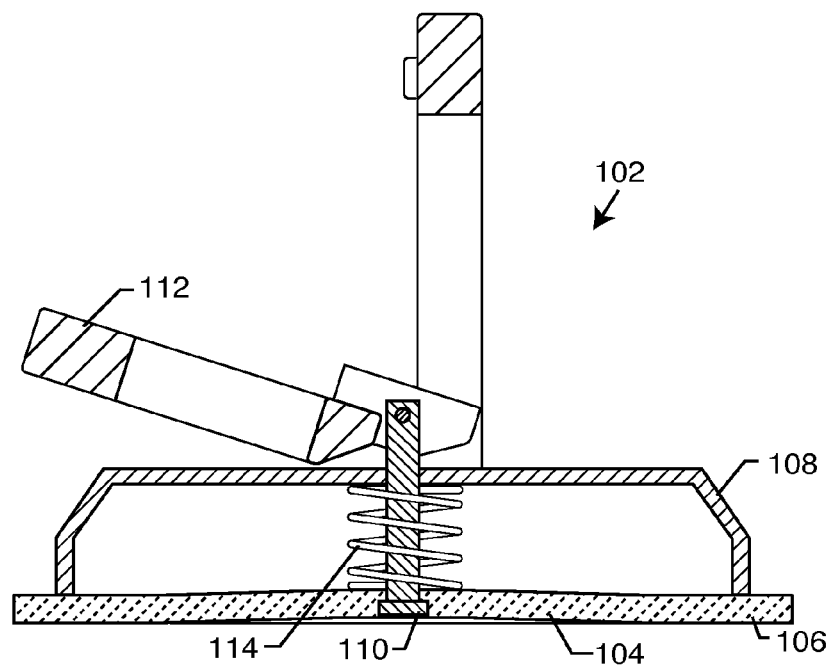
FIG. 4 is a cross-sectional view of the base of FIG. 3.
Figure 5:
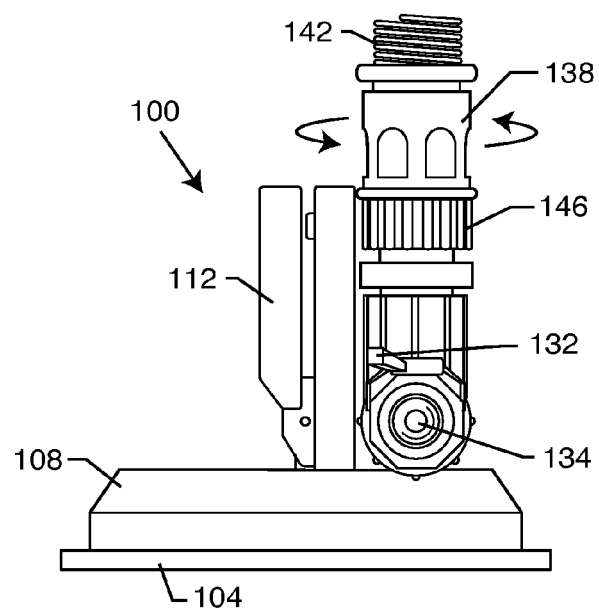
FIG. 5 is an end elevational view similar to FIG. 3, but illustrating the lever and suction membrane thereof in a raised state.
Figure 6:
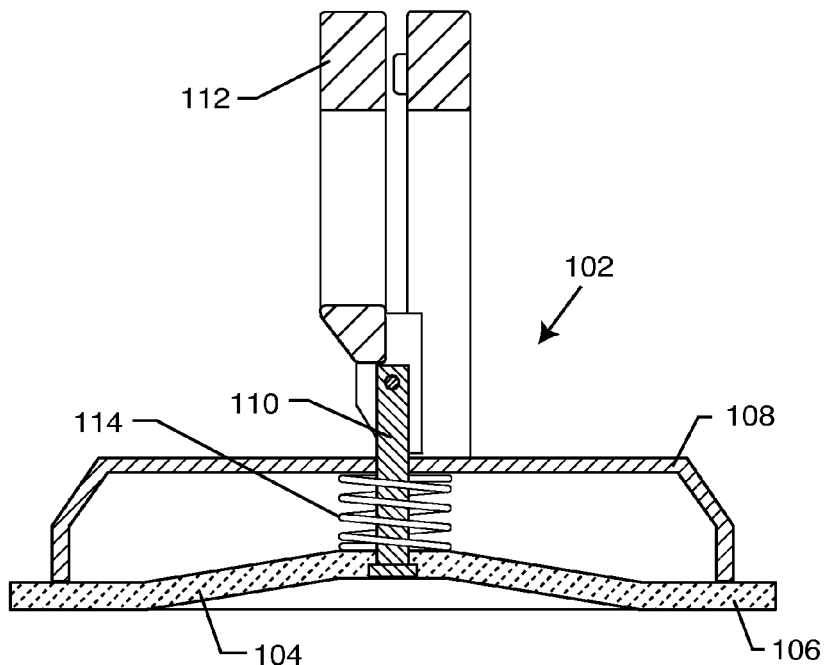
FIG. 6 is a cross-sectional view of the base of FIG. 5.
Figure 7:
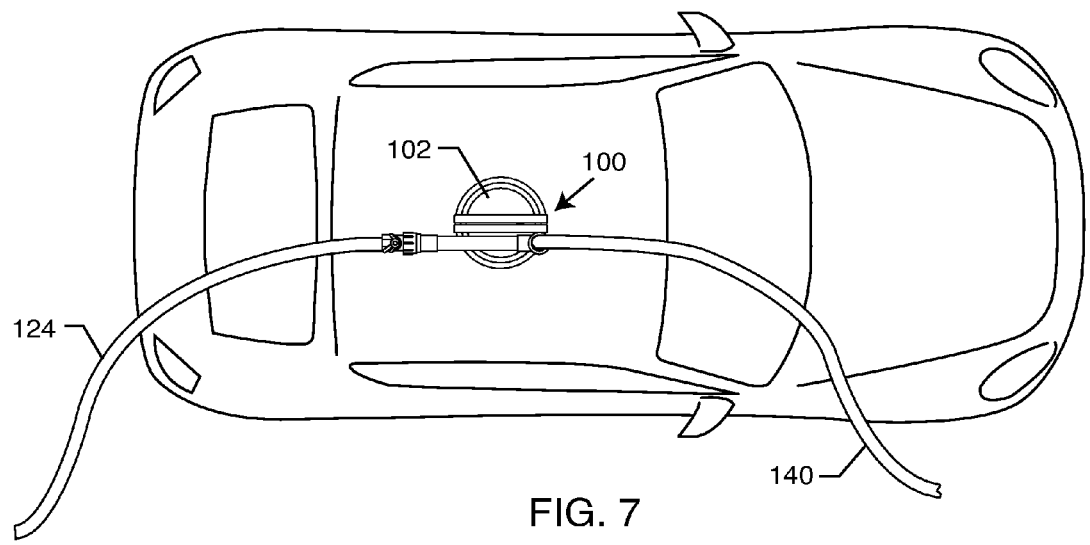
FIG. 7 is a top view of the portable manual vehicle wash assembly and vehicle of FIG. 1.

In accordance with the present invention, as illustrated in FIGS. 2-6, the base 102 includes a suction membrane 104 attached adjacent to its peripheral edge 106 to a housing 108. A pin 110 extends through the housing 108 and is connected to the membrane 104, typically substantially at a center thereof. A lever 112 is connected to a generally opposite end of the pin 110. When the lever is moved in one direction, the membrane 104 is in a generally relaxed state, as illustrated in FIG. 4. However, when the lever 112 is moved into a different position, as illustrated in FIGS. 5 and 6, the pin 110, and thus the membrane 104 are moved from a lowered position to a raised position. If the membrane 104 is placed upon a surface, such as the exterior surface 12 of a vehicle 10, raising the membrane 104 creates a negative pressure and suction, temporarily attaching or affixing the base 102, and thus the assembly 100, to the vehicle 10. A spring may be interposed between the housing 108 and the membrane 104, and surrounding the pin 110, in order to facilitate movement of the membrane 104 to its lowered and at-rest position, as illustrated in FIGS. 4 and 6.

With reference now to FIGS. 2, 3 and 5, a hollow pipe 116 is attached to the base 102, typically on the top surface of the housing 108. The pipe 116 includes a water inlet 118 formed at one end thereof and a water outlet 120 formed at a generally opposite end thereof. Preferably, the water outlet 120 is directed generally upward, or away from the exterior surface 12 of the vehicle 10, which facilitates the rotational movement of the hose, etc., and prevents objects from coming into inadvertent contact with the surface of the vehicle 10 to prevent scratches and the like. This may be accomplished by an elbow connector 122 interconnected between the end of the pipe 116 so as to define the water outlet 120 at the end thereof. At the first end of the pipe 116, the pipe may include internal or external threads (not shown) for attachment of a hose 124 thereto. Typically, the pipe 118 will have an internally threaded coupling 126 at an end thereof. In a particularly preferred embodiment, a valve member 128 is disposed between the end of the pipe and the hose 124. The valve member includes one end which is threadedly received into the coupling 126, and has an internally threaded coupling 130 of its own at an opposite end thereof for attachment to the hose 124, which extends to the source of water, typically a water spicket extending from the user's house.

Typically, the valve 128 includes a manually actuatable button or lever 132 for closing a ball valve 134, as illustrated in FIG. 3, or opening the rotatable ball valve 134, as illustrated in FIG. 5, so as to close off or open the pathway to the pipe 116 to the water coming from hose 124. This presents an added convenience to the user wherein the user may turn on the water spicket at his or her house some distance away from the vehicle to be washed, and still be able to selectively turn on and off the source of water at the assembly 100 itself, which is attached to the vehicle 10.

Although the assembly 100 can be formed as a single unit, it is also contemplated that the hollow pipe 116 be removably attached to the base 102, such as by a friction fit with a sleeve 136 which is attached to the housing 108 of the base 102, and removably accepts the pipe 116 therein. Of course, the pipe 116 can also be directly attached to the base 102, such as by fasteners, adhesive or the like.

Figure 8:
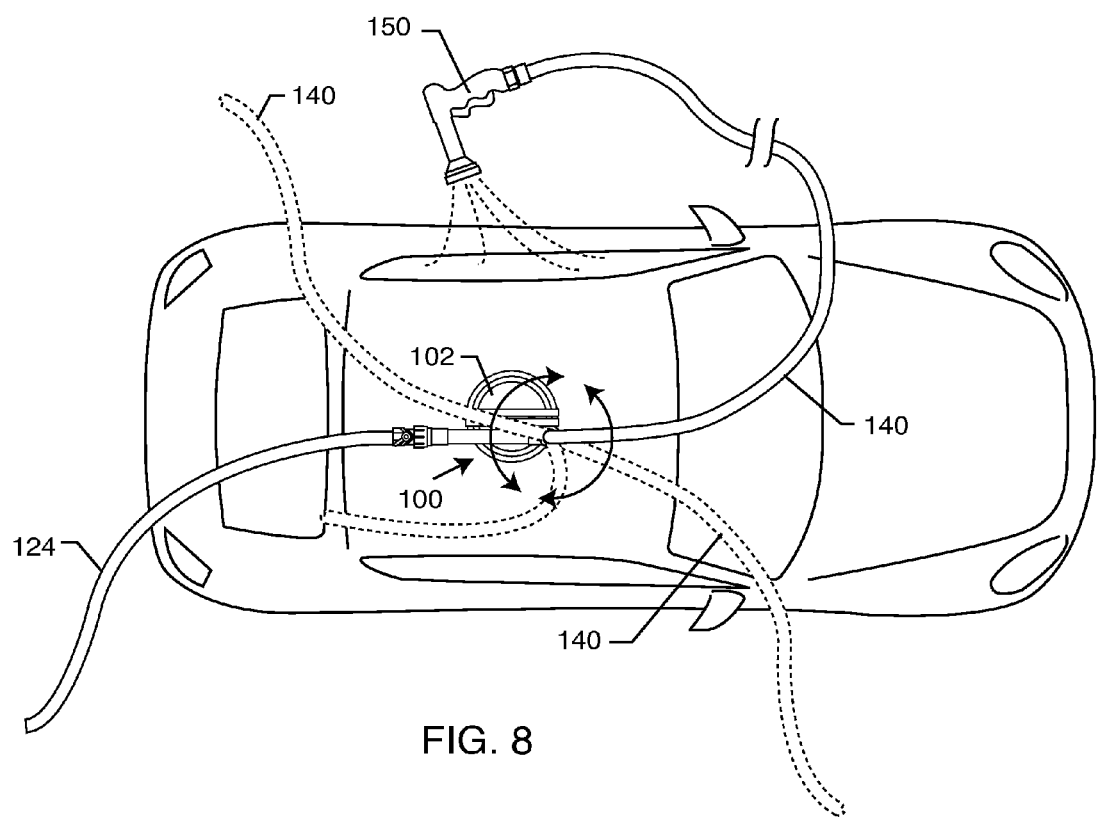
FIG. 8 is a top plan view similar to FIG. 7, illustrating a second hose moved by virtue of a swivel member of the assembly around the vehicle, in accordance with the present invention.

A swivel member 138 is attached at the water outlet 120. The swivel member 138 is configured so as to freely rotate and swivel about the outlet 120. This enables a second hose 140 used to wash the vehicle to be freely rotated and moved about the vehicle, as illustrated in FIG. 8. In this manner, the hose 140 will not as easily experience kinks in the hose, which cuts off the flow of water, as the hose 140 is moved about the vehicle 10. Moreover, given the orientation elevation of the swivel 138, generally directed upwardly or vertically from the exterior surface 12 of the vehicle 10, at least a portion of the hose 140 remains above or on top of the surface of the vehicle 10, preventing the hose from being caught on tires, bumpers and the like. The swivel 138 also allows the individual washing the vehicle to freely walk around the vehicle so as to spray the entire surface, including sides, front and back of the vehicle, as is needed to wash the entire vehicle.

The swivel includes a threaded shank 142 at one end thereof for receiving a coupling 144 of the hose 140. Although the hose coupling 144 can be threadedly attached to the outlet end 120 of the pipe 116, in a particularly preferred embodiment, a quick connect connector 146 is attached to the end 120 of the pipe 116, such as by threaded attachment. The swivel assembly 138 is then frictionally removably attached to the quick connector 146, as is known in the art.

With reference now to FIGS. 2 and 8, the second hose 140 preferably includes an adapter or coupling 144 and 148 at opposite ends thereof which are not comprised of metal, but instead of plastic, nylon or the like. In this manner, the amount of metal which can potentially scratch or otherwise damage the surface of the vehicle is minimized. However, it will be understood that a typical garden hose having the metallic metal, such as brass, fittings could also be used. Although the user can utilize hoses that the user already owns, such as a garden hose, in a particularly preferred embodiment, the hose 140 is comprised of a nylon reinforced lighter weight material, such that the hose easily glides over the vehicle and does not cause any damage thereto. Such a hose is typically between ten and twenty feet in length, and preferably does not have metallic couplings at the ends thereof, as mentioned above.

With continuing reference to FIGS. 2 and 8, a spray nozzle 150 having a trigger 152 and a spray head 154 is shown attached, such as by an adapter, quick connect, or the like 156 to the end of the second hose 140. Such hand-actuated spray nozzles or spray guns 150 are often times used in association with manually washing a vehicle as a pressurized stream of water can be created for removing dirt and grind from the surface of the vehicle 10. Typically, no water is emitted from the spray head 154 until the trigger mechanism 152 is actuated manually by the user. In other instances, water is continuously sprayed. However, in other instances, the spray nozzle 150 will include compartments and mechanisms for introducing soap, wax, etc. in a metered measure with the ejected water. However, the present invention contemplates that the user can simply press his or her thumb over the end of the hose 140 to create the sufficient pressure desired. Thus, the type of hand spraying nozzle mechanism 150 is optional, and may be provided by the end user.

Figure 9:
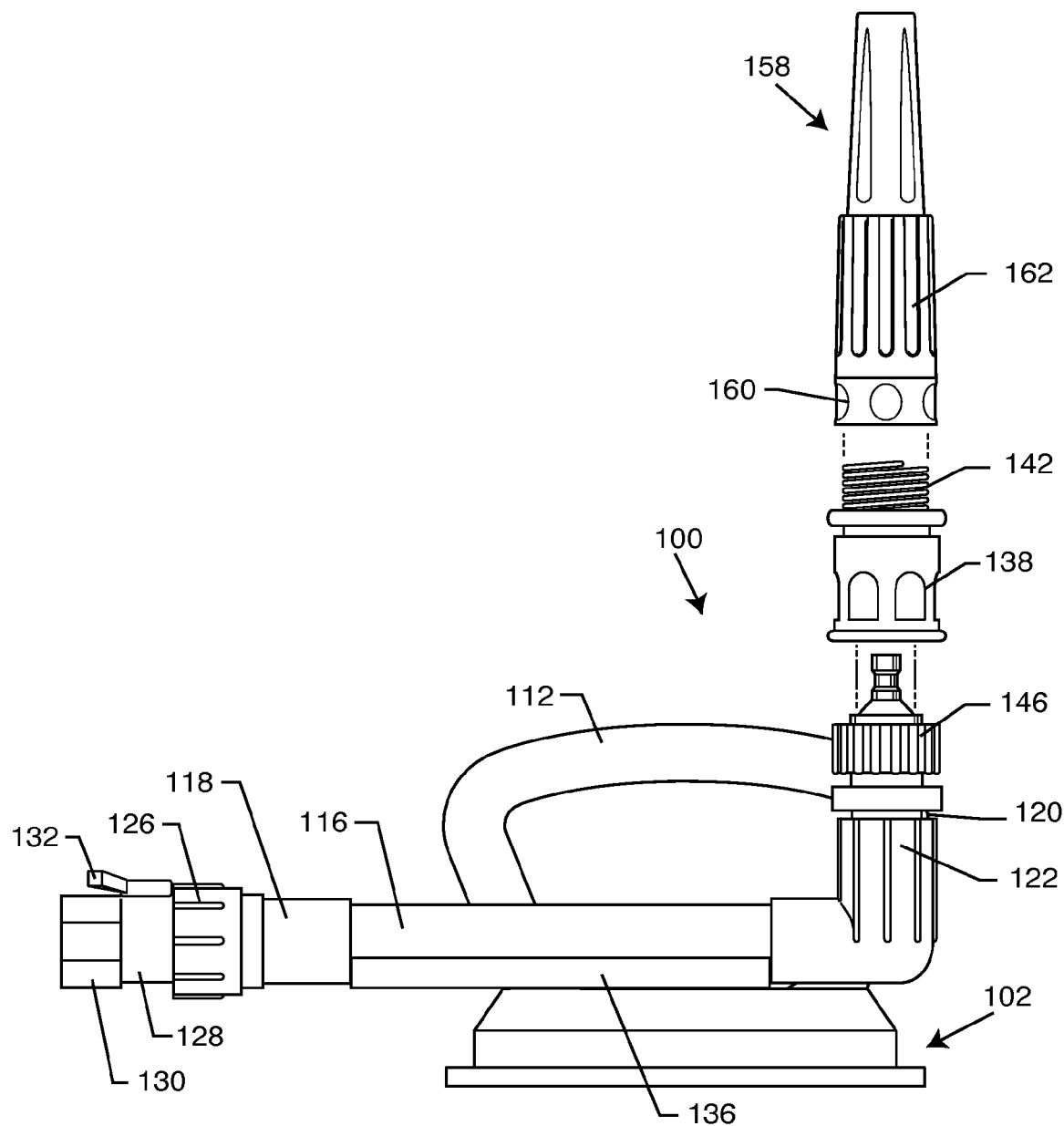
FIG. 9 is a partially exploded side elevational view of the portable manual vehicle wash assembly, illustrating a spray nozzle attachment.
Figure 10:
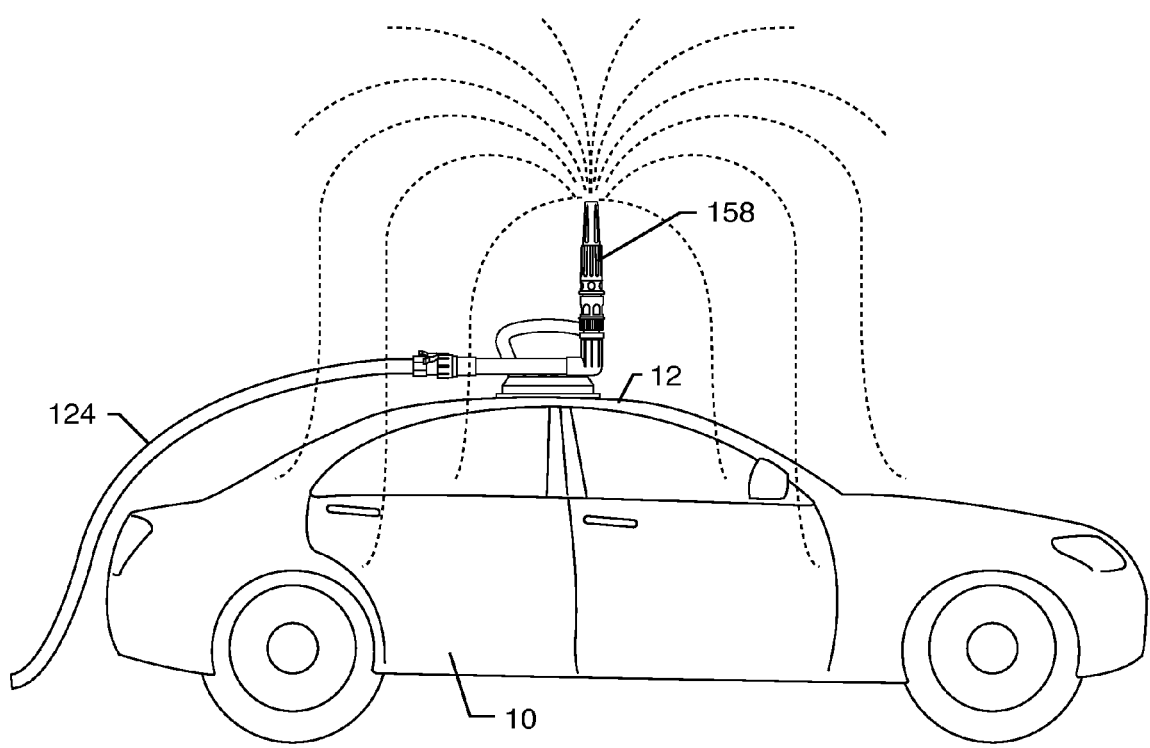
FIG. 10 is a side elevational and diagrammatic view illustrating the portable manual vehicle wash assembly attached to an exterior surface of a vehicle, and with the spray nozzle in use.

With reference now to FIGS. 9 and 10, the invention contemplates that the water emitter may be something different than a second hose 140. For example, as illustrated in FIGS. 9 and 10, the water emitter comprises a spray nozzle 158 that has an internal threaded fastener 160 that is removably attachable to the threaded shank 142 of the swivel member 138. As illustrated in FIG. 10, the spray nozzle 158 can be used to eject water substantially over the surface thereof, either as a preliminary rinse step, a final rinse step, or while washing the vehicle. Typically, such spray nozzles 158 include a rotatable flange or collar 162 which adjusts the spray pattern of the nozzle 158, and the present invention contemplates the use of such a spray nozzle 158.

In use, the base 102 of the assembly 100 is attached to the exterior top surface 12 of the vehicle 10, typically the roof. This is done, as explained above, by placing the membrane 104 onto the surface 12, and actuating the lever so as to create a suction so as to affix the base 102, and thus the assembly 100 in the desired position on the vehicle 10. The first hose 124 is connected to the second end of the pipe 116, or to the valve adapter 128. Typically, a water emitter in the form of a second hose 140 is attached to the hollow pipe, such as by means of attaching the hose 140 to the swivel member 138, which may be quickly connected to the quick connect connector 146 attached to the end 122 of the pipe 116. The user can then walk around the vehicle and spray the vehicle and wash it to remove the dust, dirt, grime, etc. The hose 140, and any spray implement 150, can be used to rinse the vehicle as well. However, another water emitter device, such as the adjustable spray nozzle 158 may be used to rinse the vehicle after the vehicle has been washed.

Although several embodiments have been described in detail for purposes of illustration, various modifications may be made without departing from the scope and spirit of the invention. Accordingly, the invention is not to be limited, except as by the appended claims.

What is claimed is:

1. A portable manual vehicle wash assembly, comprising:
   a base removably attachable to a top exterior surface of a vehicle;
   a hollow pipe attached to the base;
   a water inlet formed at a first end of the pipe and adapted to receive an end of a first hose in fluid communication with a source of water;
   a water outlet formed at a second end of the pipe and generally directed away from the exterior surface of the vehicle;
   a swivel member attached to the water outlet; and
   a water emitter removably attached to the swivel member;
   wherein the base comprises a lever operably attached to a membrane for selectively raising and lowering the membrane so as to selectively create suction between the base and the exterior surface of the vehicle; and wherein the pipe is disposed horizontally on the base, and includes an L-shaped member defining the outlet oriented vertically.

2. The assembly of claim 1, including a valve at the first end of the pipe for manually selectively permitting water to pass into the pipe.

3. The assembly of claim 2, wherein the valve is removably attached to the first end of the pipe.

4. The assembly of claim 1, wherein the water emitter comprises a second hose, having an end thereof connected to the swivel member.

5. The assembly of claim 4, including a manually actuated water nozzle attached to an opposite end of the second hose.

6. The assembly of claim 1, wherein the water emitter comprises a nozzle.

7. The assembly of claim 6, wherein the nozzle is manually adjustable.

8. The assembly of claim 4, wherein the second hose comprises a nylon hose having non-metallic couplings.

9. A portable manual vehicle wash assembly, comprising:
   a base removably attachable to a top exterior surface of a vehicle;
   a hollow pipe attached to the base;
   a water inlet formed at a first end of the pipe and adapted to receive an end of a first hose in fluid communication with a source of water;
   a water outlet formed at a second end of the pipe and generally directed away from the exterior surface of the vehicle;
   a valve at the first end of the pipe for manually selectively permitting water to pass into the pipe;
   a swivel member attached by non-threaded connection to a quick connect attached directly to the water outlet of the pipe; and
   a water emitter removably attached to the swivel member;
   wherein the base comprises a lever operably attached to a membrane for selectively raising and lowering the membrane so as to selectively create suction between the base and the exterior surface of the vehicle;
   wherein the pipe is disposed horizontally on the base, and includes a L-shaped member defining the outlet oriented vertically; and wherein the water emitter comprises a second hose having an end thereof connected to the swivel member or a manually adjustable nozzle having an end thereof connected to the swivel member.

10. The assembly of claim 9, wherein the valve is removably attached to the first end of the pipe.

11. The assembly of claim 9, including a manually actuated water nozzle attached to an opposite end of the second hose.

12. The assembly of claim 9, wherein the second hose comprises a nylon hose having non-metallic couplings.

13. The assembly of claim 1, including a quick connect connector disposed between the second end of the pipe and the swivel member.

* * * * *